Patented Mar. 29, 1932

1,851,873

UNITED STATES PATENT OFFICE

WALTER SCHULZ, OF SYDOWSAUE, NEAR STETTIN, GERMANY, ASSIGNOR TO AMERICAN GLANZSTOFF CORPORATION, OF NEW YORK, N. Y., A CORPORATION OF DELAWARE

METHOD OF IMPROVING AIR CONDITIONS IN WORKROOMS IN WHICH ARTIFICIAL PRODUCTS OF VISCOSE ARE MANUFACTURED

No Drawing. Application filed August 23, 1930, Serial No. 477,480, and in Germany September 30, 1929.

This invention has to do with a method of improving the air condition in working rooms in which filaments, films, etc. of artificial silk, especially viscose, are manufactured.

An object of this invention is to improve conditions in such a manner that noxious and injurious gases are eliminated and the workers are enabled to produce the yarns, filaments, etc., with less discomfort and danger.

Other objects will be apparent from a perusal of the following specification and claims.

In rooms where artificial products, especially those manufactured from viscose, are made, there are fumes and gases generated which are injurious to the eyes and lungs of the workers. This seems to be the case, especially, where the centrifugal process of producing artificial filaments and yarns is employed.

Until this time various methods have been tried in order to improve the working conditions of the rooms. Means for inducing a strong circulation of air have been used; ozone towers have been erected, and humidifiers have been installed, but the results have not been entirely satisfactory.

Under the process outlined in this invention all of these noxious and dangerous fumes may be vitiated through the use of organic or inorganic substances introduced into the rooms in high dispersed form. Considering, for example, workrooms in which viscose solutions are being coagulated to form the desired products, such as yarns, filaments, films, etc., and other work rooms in which the products are after-treated, an application of the new process will be given as an example. The after-treatment may take the form of moistening, wet-reeling, spooling, twisting, etc., of films or filaments produced through the use of various baths. In principle, all organic or inorganic substances which have an alkaline reaction may be used for the purpose of cleaning the air. However, alkalies such as caustic lye, potassium lye, soda and soap solutions are not, as a general rule, especially fitted for this purpose since they themselves produce effects detrimental to the viscose products. Among the mild alkalies which may be used advantageously may be mentioned ammonia ($NH_3$), as the gas, or in compounds. The gas ($NH_3$) itself gives the best results. Differing with the specific alkalies used, they may be introduced into the rooms in the form of fumes, gases, or high dispersed solutions. An advantage arises when the fumes, etc., are introduced into the rooms through the ducts through which fresh air is distributed to the rooms. Where humidifiers are used, the gas may be added thereto and introduced into the rooms in the form of a fine spray, or the liquid may be sprayed into the incoming air ducts.

Satisfactory results may be obtained from the use of only a small quantity of the alkali.

Although the foregoing paragraphs outlined the use of any alkaline material, organic or inorganic, the use of ammonia or some compound thereof is especially recommended when viscose is being treated. Therefore, the following specific example will serve to show definitely just how the process is carried out.

Example

In a spinning room for viscose rayon, with a daily production of 2200 pounds of yarn, 4400 pounds of water are introduced into the air at numerous, well distributed points, by any well known means such as the customary spray nozzle. To this quantity of water, 4.4 pounds of ammonia ($NH_3$) is added.

It is thus seen in the specific example that the addition of about 0.1% of ammonia gas ($NH_3$) to the water used for humidifying purposes will result in practically the total elimination of all noxious and dangerous fumes. Corresponding quantities of any other ammonia compounds or other alkalies used, however, would produce similar results, either with reference to viscose, or, in the case of alkalies not of ammonia or ammonium compounds, with other products being manufactured.

Having described the process in the manner required by the patent statutes, it is desired that the scope of the invention be not limited solely to the use of some particular alkali in a particular process, but only by the scope of the appended claims.

Claims:

1. A method of improving the air conditions in rooms in which artificial yarns, filaments, etc., of viscose are made, consisting of the steps of introducing a highly dispersed gaseous alkaline product into the water used as a humidifying agent for the room, and then spraying this water so treated into the air ducts supplying fresh air to the rooms.

2. A method of improving the air conditions in rooms in which artificial yarns, filaments, etc., of cellulose are manufactured, comprising the step of introducing ammonia into the water used to humidify the room, and then spraying this water, so-treated, into the air ducts entering the room.

3. A method of improving the air conditions in rooms in which artificial products of viscose are made and after-treated which comprises introducing ammonia gas into water, and spraying this water so-treated into air ducts entering the room.

4. A method of improving the air conditions in rooms in which viscose is handled which comprises treating water used for humidifying purposes with approximately one tenth of one percent of its weight of ammonia in the form of the gas $NH_3$, and spraying this mixture into the incoming air ducts of the room.

In testimony whereof I affix my signature.

WALTER SCHULZ.